United States Patent Office 2,920,786
Patented Jan. 12, 1960

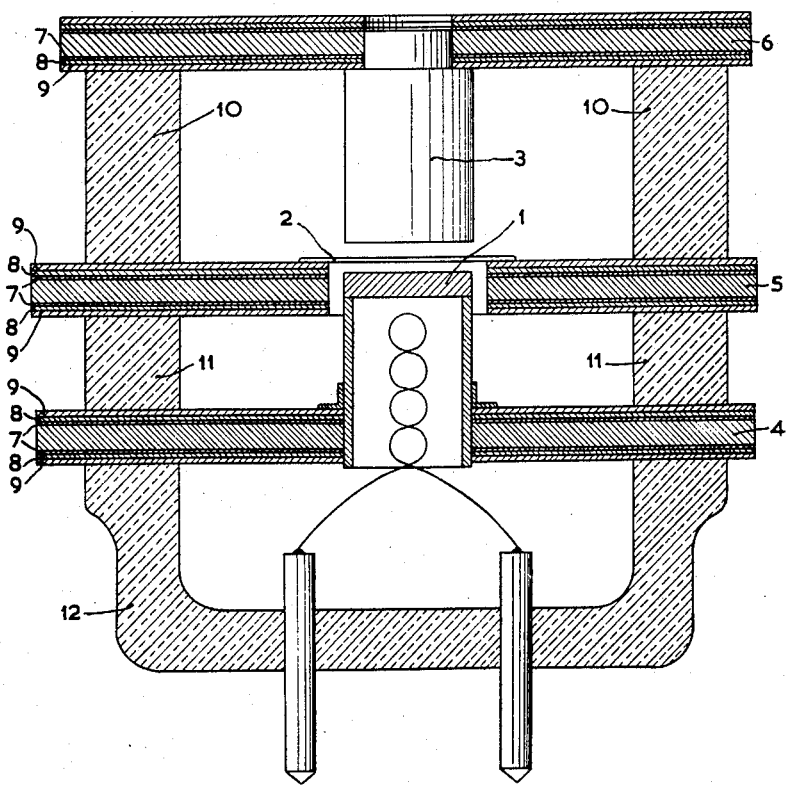
INVENTORS
JOHANNES CHRISTIAAN DURAN
MARTINUS ANTONIUS MARIA BAKKER
BY

2,920,786

ELECTRIC DISCHARGE TUBE

Johannes Christiaan Duran and Martinus Antonius Maria Bakker, Eindhoven, Netherlands, assignors to North American Philips Company, Inc., New York, N.Y., a corporation of Delaware Application June 19, 1957, Serial No. 666,634

Claims priority, application Netherlands July 12, 1956

5 Claims. (Cl. 220—2.3)

The invention relates to ferrochromium discs in glass envelopes requiring vacuum seals, these discs being plated with a comparatively thick silver layer in order to obtain a satisfactory high-frequency conduction. The invention furthermore relates to an electric discharge tube, more particularly a short-wave tube, provided with at least one such sealed-in silver-plated disc.

It is known that a ferrochromium pin (containing 15 to 30% of chromium), which is coated with a nickel, copper or silver layer, can be sealed in glass in a satisfactory manner, since during the heating process chromium diffuses towards the surface, where it constitutes a chromium oxide layer, so that a satisfactory adherence to the glass is obtained. It is furthermore known with such pins to provide between the silver and the ferrochromium substratum an intermediate layer of nickel or iron, in order to improve the adhesion of the silver to the ferrochromium.

It has been found that such known methods yield satisfactory results only if the conductor is completely surrounded by the glass and is preferably subjected to pressure.

It has been found that, when sealing in discs, in which a glass part is sealed to one side of the ferrochromium disc, such seals can be made vacuum-tight only with great difficulty.

It has now been found that a reliable vacuum-tight seal of one or more glass parts to such silver-plated ferrochromium discs can be obtained only when, in accordance with the invention the ferrochromium disc is coated first with an extremely thin intermediate nickel- or cobalt layer, then with an extremely thin intermediate gold layer (gold strike) and finally with a thick silver layer, after which the disc is heated in a chromium-oxidizing atmosphere at 900 to 1000° C., until a uniform, superficial chromium-oxide layer is formed on the silver layer and the glass parts are sealed to the surface of the disc.

The heating may take place in mixed gas consisting of a humid nitrogen-hydrogen gas mixture containing 12 to 25% of hydrogen, or in air and preferably during the very sealing operation.

The term "extremely thin layer" is to be understood to mean a layer of 0.01 to $0.2\mu$ in thickness and the term "thick layer" is to be understood to mean a layer of more than $2\mu$. In the article according to the invention the silver layer may be 5 to $15\mu$ or more in thickness without any objection.

The intermediate layers must be so very thin, since otherwise the diffusion of the chromium from the ferrochromium through these layers towards the surface takes too much time. The intermediate nickel- or cobalt layer furthers the satisfactory adhesion of the thin gold layer to the ferrochromium, whilst the gold layer forms an alloy with the silver and thus provides a satisfactory adhesion of the silver layer. With the known method just the adhesion of the silver layer to the substratum is found to be insufficient to provide vacuum-tight disc seals. The chromium which has diffused to the silver surface and which has been oxidized, provides a very satisfactory adhesion of the glass to the silver layer.

The invention will be described more fully with reference to a drawing, in which the figure shows an electric discharge tube for use with short waves and provided with such a disc seal according to the invention.

The figure shows diagrammatically a so-called disc-seal triode. This tube comprises a cathode 1, a grid 2 and an anode 3, which electrodes are supported from the sealed-in discs 4, 5 and 6 respectively, consisting of ferrochromium containing 25% by weight of chromium. These discs are coated with a cobalt layer 7 of about $0.05\mu$, a gold layer 8 of about the same thickness and a comparatively thick silver layer 9 of 5 microns, which is shown on a greatly enlarged scale in the figure. This silver layer 9 serves to obtain a satisfactory conduction of the high-frequency currents.

The discs are sealed within 15 to 30 sec. to the rings 10 and 11 and the bottom part 12, consisting of ordinary tube bulb glass with 37% PbO by weight, at a temperature of 800 to 1000° C., the heating required for this sealing operation may take place in air or in humid mixed gas, so that during this operation the silver layer is coated with a thin chromium-oxide film.

It will be appreciated that many further embodiments of tube construction in accordance with the invention are possible. For example, some of the glass-bodies may be formed as a layer of glass, sandwiched between a ceramic body and the metal disc to which it is sealed.

What is claimed is:

1. An electric discharge tube comprising an envelope having a glass portion hermetically sealed to a metal member, said metal member comprising an iron-chomium base, an extremely thin first layer of a metal selected from the group consisting of cobalt and nickel covering said base, a second extremely thin layer of gold covering said first metal layer, a relatively thick layer of silver covering said gold layer, and a layer of chromium oxide covering said silver layer and sealing said member to said glass portion.

2. An electric discharge tube comprising an envelope having two glass portions separated by a metal disc member adapted to support an electrode in said envelope, said disc member being hermetically sealed to said glass portions and comprising a base of iron-chromium, an extremely thin first layer of metal selected from the group consisting of cabalt and nickel covering opposite sides of said disc, a second extremely thin layer of gold on opposite sides of said disc covering said first metal layer, a relatively thick layer of silver covering said gold layer on opposite sides of said disc, and a layer of chromium oxide covering said silver layer on opposite sides of said disc and sealing said member to said respective glass portions.

3. An electric discharge tube comprising an envelope having a glass portion hermetically sealed to a metal member, said metal member comprising a base of iron-chromium, an extremely thin first layer of nickel covering said base, a second extremely thin layer of gold covering said first nickel layer, a relatively thick layer of silver covering said gold layer, and a layer of chromium oxide covering said silver layer and sealing said metal member to said glass portion.

4. An electric discharge tube comprising an envelope having a glass portion hermetically sealed to a metal member, said metal member comprising a base of iron-chromium, an extremely thin first layer of cobalt covering said base, a second extremely thin layer of gold covering said first cobalt layer, a relatively thick layer of silver covering said gold layer, and a layer of chromium oxide covering said silver layer and sealing said metal member to said glass portion.

5. An electric discharge tube comprising an envelope having a glass portion hermetically sealed to a metal member comprising an iron-chromium base, a first layer of a metal selected from the group consisting of nickel and cobalt and having a thickness of about 0.1 to $0.2\mu$, a second layer of gold having a thickness of about 0.1 to $0.2\mu$ covering said first metal layer, a layer of silver having a thickness exceeding $2\mu$ covering said gold layer, and a layer of chromium oxide covering said silver layer and sealing said metal member to said glass portion.

References Cited in the file of this patent
UNITED STATES PATENTS

| | | |
|---|---|---|
| 1,989,236 | Laise | Jan. 29, 1935 |
| 2,471,424 | Glauber | May 31, 1949 |
| 2,480,453 | Dorgelo et al. | Aug. 30, 1949 |
| 2,617,959 | Fay | Nov. 11, 1952 |
| 2,670,572 | Smith | Mar. 2, 1954 |
| 2,683,835 | Freedman | July 13, 1954 |
| 2,760,310 | Nelson | Aug. 28, 1956 |